United States Patent
Yoo (10) Patent No.: US 8,824,250 B2
(45) Date of Patent: Sep. 2, 2014

(54) ARCHIVE SYSTEM FOR DOUBLE SIDED OPTICAL DISC

(71) Applicant: Hitachi-LG Data Storage Korea, Inc., Seoul (KR)

(72) Inventor: Seunghon Yoo, Seoul (KR)

(73) Assignee: Hitachi-LG Data Storage Korea, Inc., Seoul (KR)

( * ) Notice: Subject to any disclaimer, the term of this patent is extended or adjusted under 35 U.S.C. 154(b) by 0 days.

(21) Appl. No.: 13/670,261

(22) Filed: Nov. 6, 2012

(65) Prior Publication Data

US 2014/0126340 A1 May 8, 2014

(51) Int. Cl.
*G11B 7/00* (2006.01)

(52) U.S. Cl.
USPC .............. 369/30.06; 369/30.57; 369/30.43; 369/30.45; 369/30.55; 720/615

(58) Field of Classification Search
USPC ............. 369/30.06, 30.2, 30.28, 30.4, 30.45, 369/30.48, 30.43, 30.55, 30.57; 720/614, 720/615
See application file for complete search history.

(56) References Cited

U.S. PATENT DOCUMENTS

| | | | | | |
|---|---|---|---|---|---|
| 5,757,761 | A | * | 5/1998 | Menke et al. | 369/30.65 |
| 5,933,396 | A | * | 8/1999 | Hammar et al. | 369/30.43 |
| 5,995,459 | A | * | 11/1999 | Kappel et al. | 369/30.55 |
| 5,999,356 | A | * | 12/1999 | Dimitri et al. | 360/71 |
| 6,456,572 | B1 | * | 9/2002 | Sakamoto | 369/30.56 |
| 8,085,625 | B2 | * | 12/2011 | Chang | 369/30.85 |
| 8,385,163 | B2 | * | 2/2013 | Goyal et al. | 369/30.03 |
| 2001/0055266 | A1 | * | 12/2001 | Suzuki et al. | 369/200 |
| 2002/0167749 | A1 | * | 11/2002 | Kulakowski et al. | 360/69 |
| 2010/0014391 | A1 | * | 1/2010 | Douglass et al. | 369/30.06 |
| 2010/0287576 | A1 | * | 11/2010 | Terzis et al. | 720/630 |
| 2012/0117578 | A1 | | 5/2012 | Goyal et al. | |

FOREIGN PATENT DOCUMENTS

| | | |
|---|---|---|
| JP | 8-249782 A | 9/1996 |
| JP | 11-296951 A | 10/1999 |
| JP | 2000-173148 A | 6/2000 |
| JP | 2001-357595 A | 12/2001 |
| JP | 2008-186539 A | 8/2008 |
| JP | 2008-186552 A | 8/2008 |

* cited by examiner

*Primary Examiner* — Thomas Alunkal
(74) *Attorney, Agent, or Firm* — Birch, Stewart, Kolasch & Birch, LLP (57) ABSTRACT

Disclosed is an archive system for a double sided optical disc, in which optical disc drives for recording or reading data on second surfaces of double sided optical discs are mounted in at least one of first and second drive bays respectively mounted at left and right sides of a disc picker robot, so that data recording or reading operations on first and second surfaces of double sided optical discs can be automatically performed.

3 Claims, 11 Drawing Sheets

ARCHIVE SYSTEM FOR DOUBLE SIDED OPTICAL DISC

BACKGROUND

1. Field

This document relates to an archive system suitable for a double sided optical disc having two data recording surfaces respectively formed on opposite surfaces thereof.

2. Related Art

An archive system is a kind of database which keeps digital information converted from collections, data, etc., and maintains and manages relationships between data. The archive system is a system which enables permanent recording, preservation, etc. by digitalizing information that may have a degraded quality or be scattered as time elapses. The archive system does not simply store information but systemizes and store information to be efficiently used.

Figure 1:
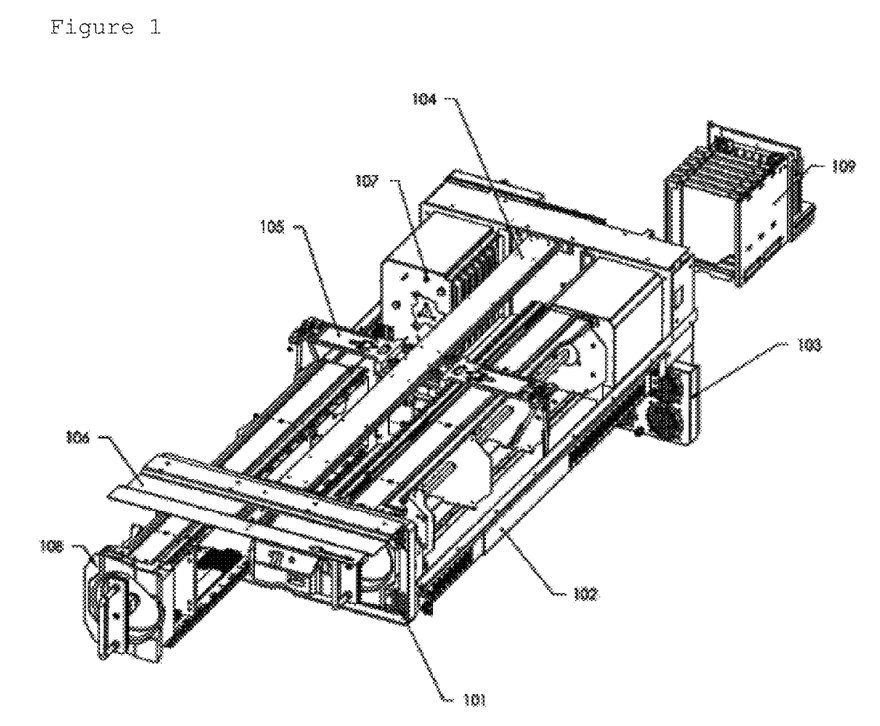
FIG. 1 illustrates a configuration of a general archive system.

For example, in an archive system, a rail 102 is mounted at a side of a main chassis 101 as shown in FIG. 1, and hence several disc drives can be mounted to a rack of a data center.

A cooling fan is mounted to a rear cover 103 mounted at a rear of the archive system. A disc picker robot 105 moved in a horizontal direction by a linear guide 104 is mounted at the center of the main chassis 101.

If a front door 106 of the archive system is opened, a user can extract, to the outside of the archive system, or insert, into the inside of the archive system, disc cartridges 108 respectively mounted at both sides of the disc picker robot 105. For example, 250 optical discs can be kept in the disc cartridge 108, and thus a maximum of 500 optical discs can be kept in both the disc cartridges 108.

A drive bay is mounted at a rear of the disc cartridge 108. For example, six optical disc drives (ODDs) are inserted into the drive bay. A maximum of twelve ODDs are inserted into drive bays 107 and 109 respectively mounted at left and right sides of the disc picker robot 105, so that recording or reproducing operations of data can be simultaneously performed.

Figure 2:
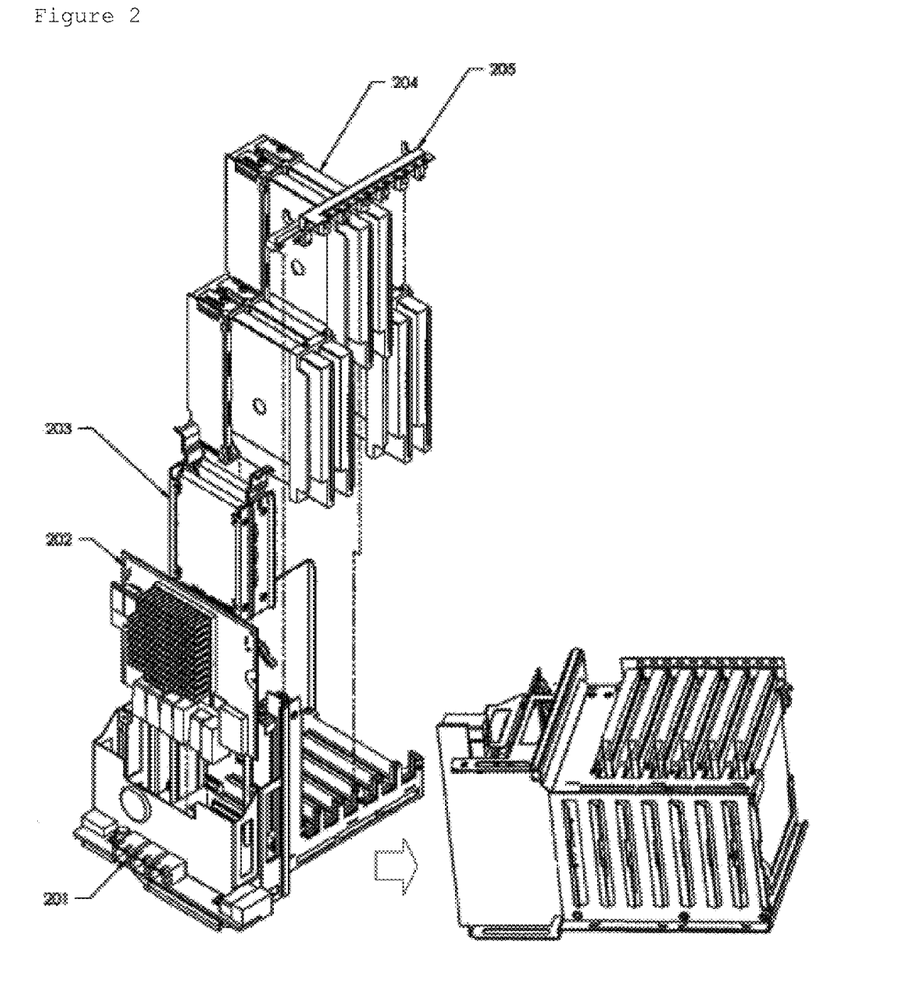
FIG. 2 illustrates a configuration of a general drive bay.

The drive bays 107 and 109 may be referred to as, for example, field replacement units. As shown in FIG. 2, each drive bay may comprise three internal connectors 201, a single board computer (SBC) 202, a hard disc 203 and six ODDs 204. The six ODDs 204 are firmly fixed by a stabilizer 205.

Figure 3:
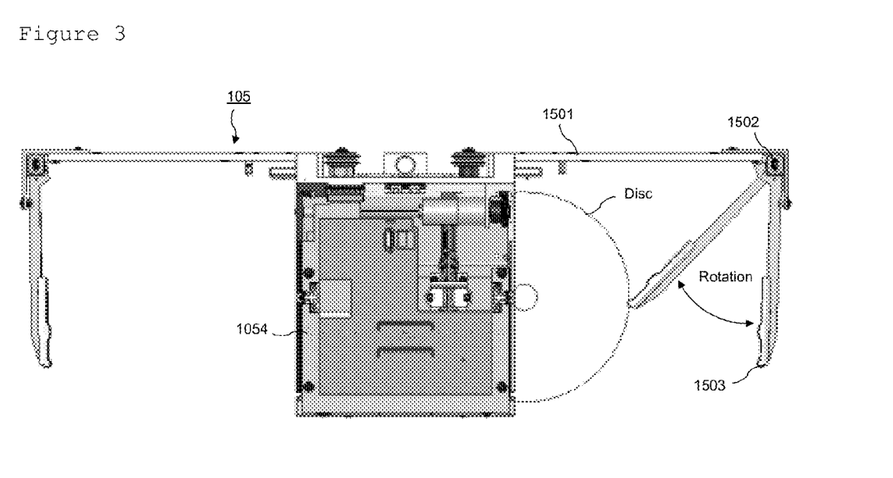
FIG. 3 illustrates a configuration of a general disc picker robot.

As shown in FIG. 3, the disc picker robot 105 may comprise a main frame 1501, a motor 1502, a kicker 1503 and a picker 1504. For example, two step motors and two kickers may be mounted at both sides of the main frame 1501 having a shoulder shape, respectively.

An optical disc extracted from the disc cartridge is inserted into the picker 1504 by a rotation operation of the kicker 1503. For example, two optical discs can be simultaneously inserted into the picker 1504, and the disc picker robot 105 inserts an optical disc into an arbitrary ODD by passing through central moving paths of the left and right drive bays 107 and 109.

Figure 4:
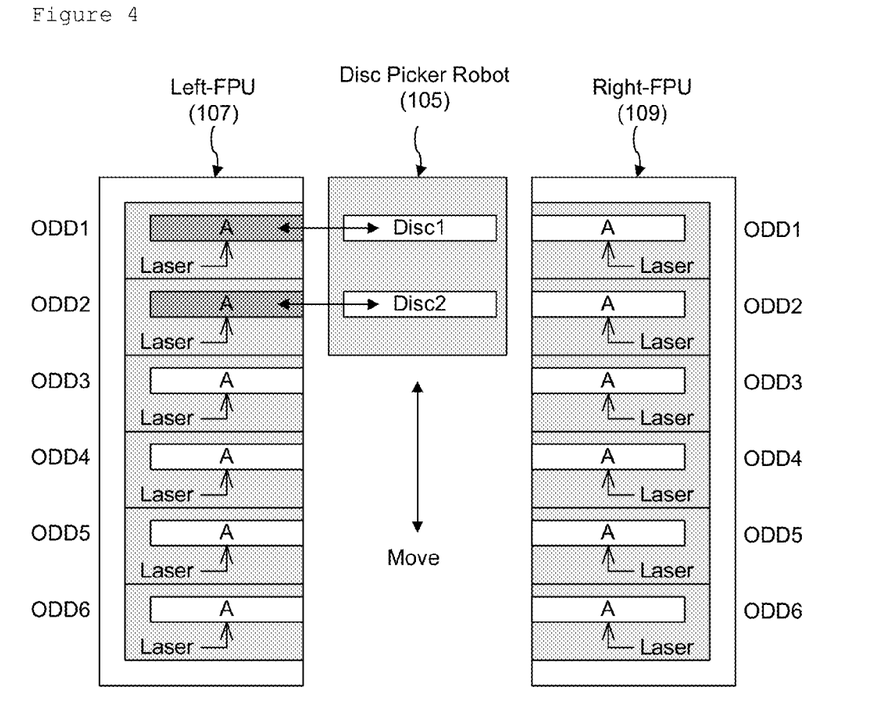
FIG. 4 illustrates an exemplary embodiment in which an optical disc is inserted into an optical disc drive of the general drive bay.

For example, as shown in FIG. 4, first and second optical discs Disc1 and Disc2 extracted and then moved by the disc picker robot 105 may be respectively inserted into first and second optical disc drives ODD1 and ODD2 mounted in the left drive bay 107.

The SBC 202 mounted in the left drive bay 107 performs a series of data recording/reproducing operations of recording or reproducing data on first and second optical discs by controlling the first and second optical disc drives ODD1 and ODD2.

If the data recording/reproducing operations described above are finished, the disc picker robot 105 collects the first and second optical discs, moves the collected optical discs to the original disc cartridge, and then kept the optical discs in the disc cartridge.

However, as shown in FIG. 4, ODDs are mounted in the drive bay 107 so that data can be recorded/reproduced only in one direction. Hence, in case of a double sided optical disc having two data recording surfaces formed on opposite surfaces thereof, there is an inconvenience in that a user should record data on one surface of the double sided optical disc and then turn over the double sided optical disc to be inserted in the opposite direction.

SUMMARY

An aspect of this document is to provide an archive system for a double sided optical disc, which enables a data recording or reading operation to be automatically performed on first and second surfaces of the double sided optical disc.

In an aspect, an archive system for a double sided optical disc comprises: a disc cartridge for keeping optical discs; a drive bay for mounting optical disc drives therein; and a disc picker robot for extracting the optical discs kept in the disc cartridge and inserting the extracted optical discs into the optical disc drives mounted in the drive bay, wherein first and second drive bays are respectively mounted at left and right sides of the disc picker robot, and wherein optical disc drives for recording or reading data on first surfaces of double sided optical discs are mounted in the first drive bay, and optical disc drives for recording or reading data on second surfaces of the double sided optical discs are mounted in the second drive bay.

The disc picker robot carries two or more optical discs, and the interval between two optical discs carried by the disc picker robot is identical to that between two optical disc drives mounted in a same drive bay.

The recording or reading operation on a first surface of a double sided optical disc is finished by the optical disc drive of the first drive bay, the disc picker robot extracts the double sided optical disc and then inserts the extracted double sided optical disc into the optical disc drive of the second drive bay.

An insertion slot of the first optical disc drive of the first drive bay and an insertion slot of the second optical disc drive of the second drive bay, which faces the first optical disc drive, are spaced apart from each other at a predetermined distance, along a direction in which the disc picker robot moves, and the disc picker robot extracts the double sided optical disc from the first optical disc drive, moves the extracted double sided optical disc by the predetermined distance and then inserts the double side optical disc into the second optical disc drive.

The first and second drive bays are spaced apart from each other at a predetermined distance so that the insertion slot of the first optical disc drive of the first drive bay and the insertion slot of the second optical disc drive of the second drive bay, which faces the first optical disc drive, are aligned with each other, along the direction in which the disc picker robot moves.

In another aspect, an archive system for a double sided optical disc comprises: a disc cartridge for keeping optical discs; a drive bay for mounting optical disc drives therein; and a disc picker robot for extracting the optical discs kept in the disc cartridge and inserting the extracted optical discs into the optical disc drives mounted in the drive bay, wherein first and second drive bays are respectively mounted at left and right sides of the disc picker robot, wherein an optical disc drive for recording or reading data on a first surface of a double sided optical disc and an optical disc drive for recording or reading data on a second surface of the double sided optical disc, which form a pair, are repetitively mounted in the first and second drive bays, and wherein any one of an optical disc drive of the first drive bay and an optical disc drive of the second bay, which face the optical disc drive of the first drive bay, records or reads data on the first surface, and the other records or reads data on the second surface.

The disc picker robot carries two or more optical discs, and carries the two or more optical discs at an interval between two optical disc drives closest along a direction in which the disc picker robot moves, which record data on surfaces in a same direction.

When carrying two optical discs, the disc picker robot records or reads data on first or second surfaces of the optical discs by respectively inserting the optical discs into a first optical disc drive of the first drive bay and a second disc drive of the second drive bay.

When a data recording or reading operations on the first or second surfaces are finished, the disc picker robot extracts the two optical discs, moves by the interval between an insertion slot of the first optical disc drive of the first drive bay and an insertion slot of the first optical disc drive of the second drive bay, respectively inserts the optical discs into the first optical disc drive of the second drive bay and the second optical disc drive of the first drive bay, and then records or reads data on the second or first surfaces of the optical discs.

In still another aspect, an archive system for a double sided optical disc comprises: a disc cartridge for keeping optical discs; a drive bay for mounting optical disc drives therein; and a disc picker robot for extracting the optical discs kept in the disc cartridge and inserting the extracted optical discs into the optical disc drives mounted in the drive bay, wherein first and second drive bays are respectively mounted at left and right sides of the disc picker robot, wherein n optical disc drives for recording or reading data on first surfaces of double sided optical discs and n optical disc drivers for recording or reading data on second surfaces of double sided optical discs are sequentially mounted in the first drive bay, and wherein n optical disc drives for recording or reading data on second surfaces of double sided optical discs and n optical disc drivers for recording or reading data on first surfaces of double sided optical discs are sequentially mounted in the second drive bay.

In an archive system for a double sided optical disc according to the present invention, data recording/reading operations can be automatically performed on first and second surfaces of the double sided optical disc, so that it is possible to prevent an inconvenience in that a user turns over the double side optical disc to be inserted.

DETAILED DESCRIPTION

The above objects, characteristics, and merits of this document will become more apparent from the following detailed description taken in conjunction with the accompanying drawings. This document can be modified in various ways and can have several embodiments. Hereinafter, some of the embodiments are shown in the accompanying drawings and described in detail with reference to the drawings. The same reference numerals, as a general rule, designate the same elements throughout the specification. Further, a detailed description of the known functions or constructions will be omitted if it is deemed to make the gist of this document unnecessarily vague. It is also to be noted that numbers (e.g., first and second) used in the description of this document are only identification symbols for distinguishing one element from the other element. The above and other objects, features and advantages of the present invention will become apparent from the following detailed description taken with the accompanying drawings. As the invention allows for various changes and numerous embodiments, particular embodiments will be illustrated in the drawings and described in detail in the written description. Like reference numerals designate like elements throughout the specification. In the following description, detailed descriptions of well-known functions or constructions will be omitted since they would obscure the invention in unnecessary detail.

First, as described with reference to FIGS. 1 to 3, an archive system for a double sided optical disc according to the present invention comprises a disc cartridge for keeping a plurality of optical discs, a drive bay in which a plurality of optical disc drives ODDs are mounted, a disc picker robot for extracting an optical disc kept in the disc cartridge and inserting the extracted optical disc into an ODD of the drive bay, etc.

First and second drive bays, each in which six ODDs are mounted for example, are mounted opposite to each other at left and right sides of the disc picker robot.

The disc picker robot 105 moves while simultaneously loading two or more optical discs. The disc picker robot 105 may simultaneously insert or extract the optical discs into or from ODDs of the drive bay.

Figure 5:
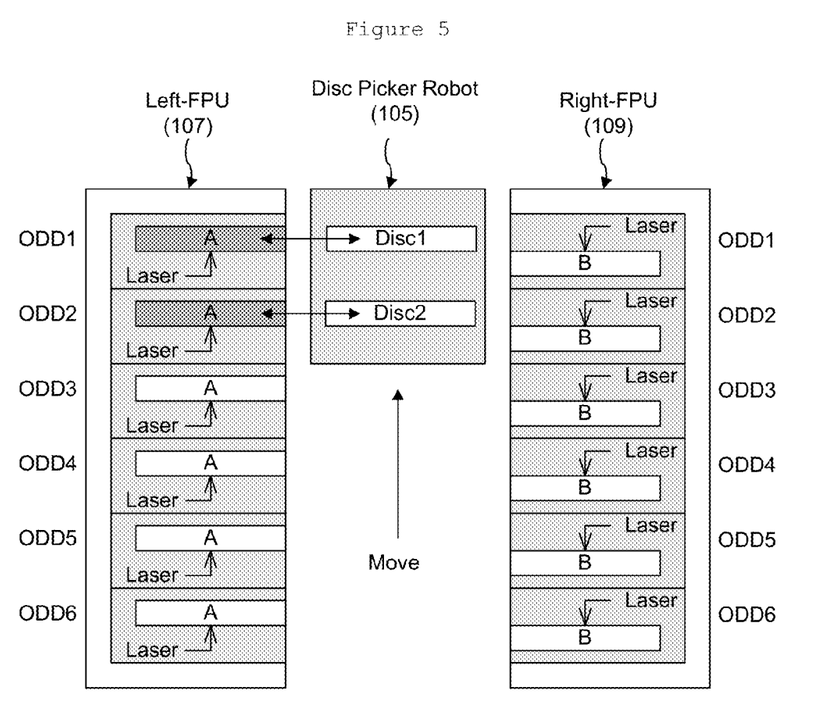
FIGS. 5 and 6 schematically illustrate an archive system for a double sided optical disc according to a first exemplary embodiment of the present invention.

In an archive system according to the first exemplary embodiment of the present invention, as shown in FIG. 5, six ODDs are mounted in the left first drive bay 107 in a direction in which data can be recorded on a first surface A of a double sided optical disc, and six ODDs are mounted in the right second drive bay 109 in a direction in which data can be recorded on a second surface A of the double sided optical disc.

The disc picker robot 105 extracts two double sided optical discs Disc1 and Disc2 kept in the disc cartridge and then inserts the two double sided optical discs respectively into first and second optical disc drives ODD1 and ODD2 mounted in the first drive bay 107 by moving between the first and second drive bays 107 and 109.

A single board computer (SBC) of the first drive bay 107 controls the first and second optical disc drives ODD1 and ODD2 of the first drive bay 107, so as to perform a series of data recording operations of recording data on first surfaces A of the two double sided optical discs Disc1 and Disc2. It will be apparent that the first and second optical disc drives ODD1 and ODD2 may perform data reading operations of reading the data recorded on the first surfaces A of the two double sided optical discs Disc1 and Disc2.

Figure 6:
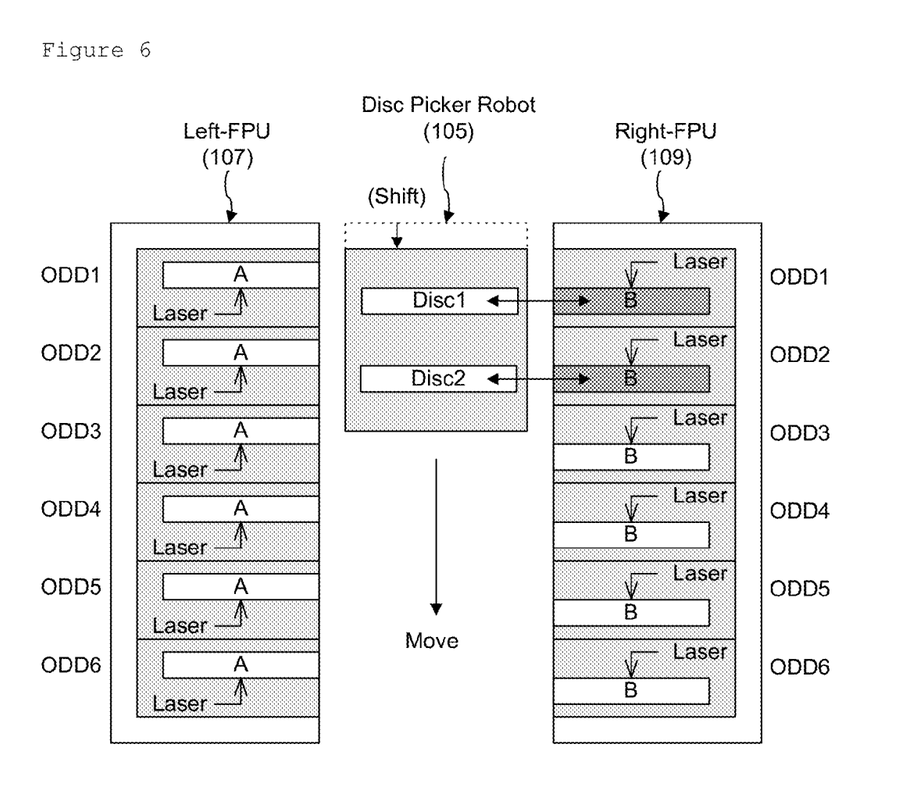

If the data recording operation on the first surface A is finished as described above, the disc picker robot 105 extracts the two double sided optical discs Disc1 and Disc2 and then inserts the two double sided optical discs Disc1 and Disc2 respectively into first and second optical disc drives ODD1 and ODD2 mounted in the second drive bay 109.

An SBC of the second drive bay 109 controls the first and second optical disc drives ODD1 and ODD2 of the second drive bay 109, so as to perform a series of data recording operations of recording data on second surfaces B of the two double sided optical discs Disc1 and Disc2.

Optical disc insertion slots respectively formed in the ODDs of the first and second drive bays 107 and 109 face each other, and may be mounted, for example, while being spaced apart from each other at a predetermined distance as shown in FIGS. 5 and 6. Hence, the disc picker robot 105 extracts two double sided optical discs from the first and second optical disc drives ODD1 and ODD2 of the first drive bay 107 and then inserts the two double sided optical discs into the respective first and second optical disc drives ODD1 and ODD2 mounted in the second drive bay 109 by moving between the first and second drive bays 107 and 109 by the predetermined distance.

In the first exemplary embodiment of FIGS. 5 and 6, the interval between the insertion slots through which the optical discs are into adjacent ODDs of the first drive bay 107 is constant (similar to the second drive bay 109). Thus, the interval between two or more optical discs loaded by the disc picker robot 105 that carries the optical discs is set to be identical to that between the insertions slots, so that the disc picker robot 105 can simultaneously insert/extract two optical discs into/from the ODDs. In the first exemplary embodiment, when inserting the optical discs from the ODDs of the first drive bay 107 into the second drive bay 109, the disc picker robot 105 moves by a certain interval at which the positions of the two drive bays 107 and 109 cross each other.

Accordingly, data can be automatically recorded on the first and second surfaces of the double sided optical disc without user's turning over the double sided optical disc and inserting the double sided optical disc in the opposite direction.

Figure 7:
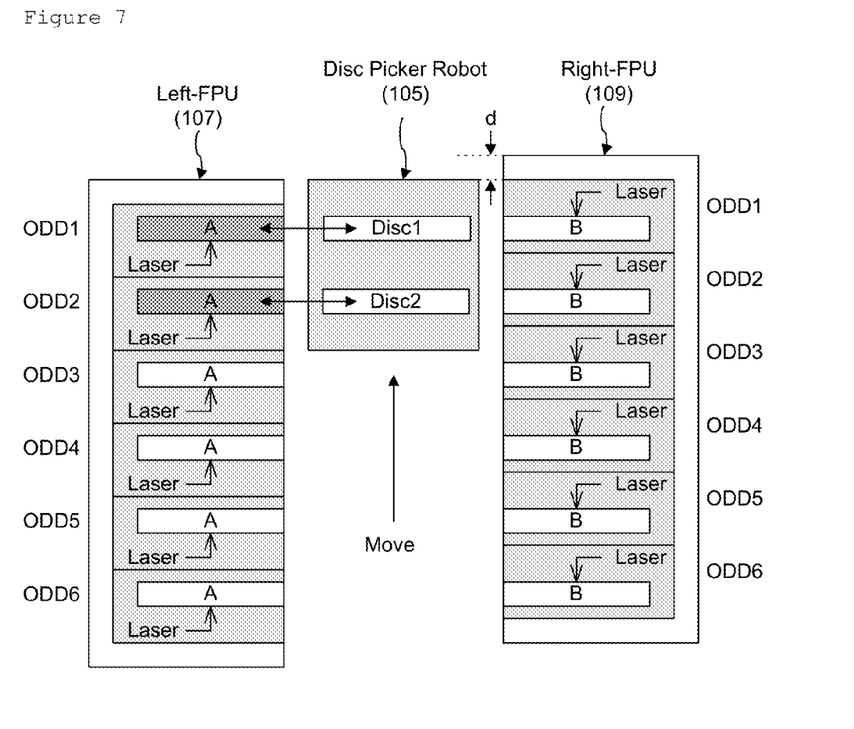
FIGS. 7 and 8 schematically illustrate an archive system for a double sided optical disc according to a second exemplary embodiment of the present invention.

Meanwhile, in an archive system according to a second exemplary embodiment of the present invention, six ODDs that can record data on first surfaces A of double sided optical discs are mounted in the left first drive bay 107, and six ODDs that can record data on second surfaces B of double sided optical discs are mounted in the right second drive bay 109. The first and second drive bays 107 and 109 are mounted while being spaced apart from each other at a predetermined distance, along the direction in which the disc picker robot 105 moves.

For example, as shown in FIG. 7, the first and second drive bays 107 and 109 are mounted while being spaced apart from each other at a predetermined distance d measured as the result of a previously performed experiment so that optical disc insertion slots respectively formed in the ODDs of the first and second drive bays 107 and 109 face each other at the same position, i.e., so that the two insertion slots of the two ODDs, which face each other, are aligned with each other, based on the direction in which the disc picker robot 105 moves.

Figure 8:
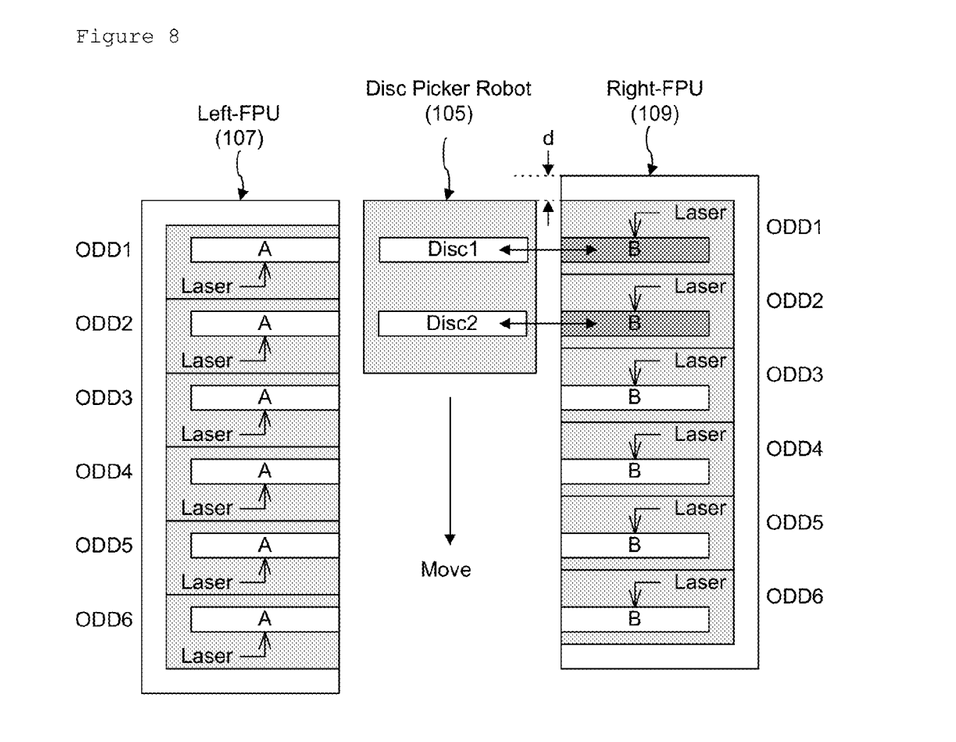

As shown in FIG. 8, the disc picker robot 105 more quickly inserts two double sided optical discs extracted from the respective first and second ODDs of the first drive bay 107 into the first and second ODDs of the second drive bay 109 without any separate movement, so that data can be automatically recorded on the first and second surfaces of the double sided optical disc.

Figure 9:
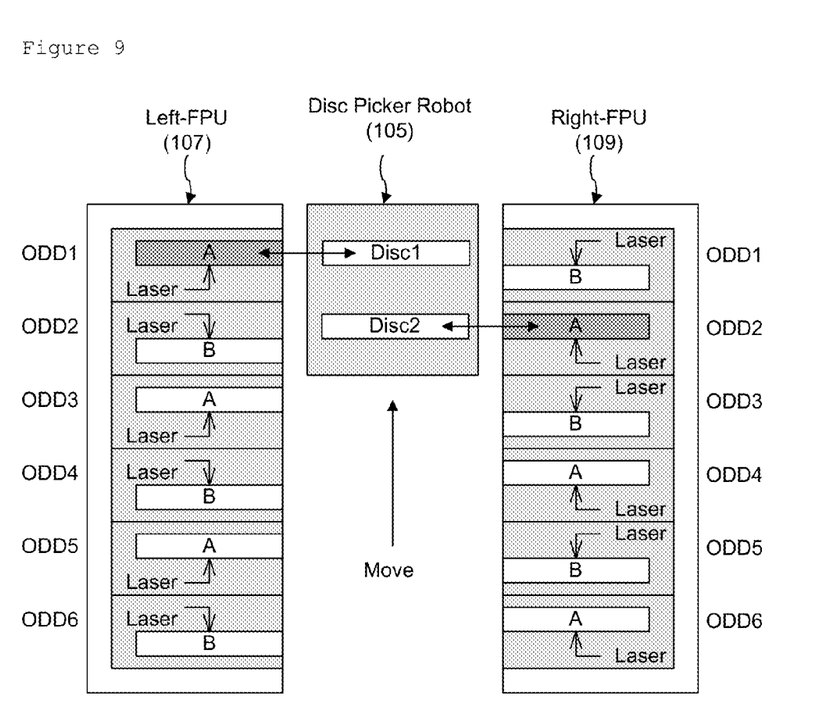
FIGS. 9 and 10 schematically illustrate an archive system for a double sided optical disc according to a third exemplary embodiment of the present invention.

Meanwhile, in an archive system according to a third exemplary embodiment, an ODD capable of recording data on the first surface A of the double sided optical disc and an ODD capable of recording data on the second surface B of the double sided optical disc form a pair, so as to be repetitively mounted in the left first drive bay and the right second drive bay.

For example, as shown in FIG. 9, a pair of ODDs capable of respectively recording data on the first and second surfaces A and B are repetitively mounted in the left first drive bay 107, and a pair of ODDs capable of respectively recording data on the second and first surfaces B and A are repetitively mounted in the right second drive bay 109. In this case, the data recording surfaces of the ODDs opposite to each other, i.e., the first optical disc drive ODD1 of the first drive bay 107 and the first optical disc drive ODD1 of the second drive bay 109, are different from each other as the first and second surfaces A and B.

In the disc picker robot 105, the interval between two or more optical discs loaded by the disc picker robot 105 may be set to that between two closest ODDs that record data on surfaces in the same direction. In FIG. 9, the first optical disc drive ODD1 of the first drive bay 107 and the second optical disc drive ODD2 of the second drive bay 109, which record data on the first surfaces A, are closest to each other. Thus, the disc picker robot 105 can load two optical discs at the interval between the two ODDs.

The disc picker robot 105 extracts two double sided optical discs Disc1 and Disc2 kept in the disc cartridge and then inserts the first optical disc Disc1 into the first optical disc drive ODD1 mounted in the first drive bay 107, and inserts the second optical disc Disc2 into the second optical disc drive ODD2 mounted in the second drive bay 109 by moving between the first and second drive bays 107 and 109 by the interval between the insertion slot of the first optical disc drive ODD1 of the first drive bay 107 and the insertion slot of the first optical disc drive ODD1 of the second drive bay 109.

The SBC of the first drive bay 107 records data on the first surface of the first optical disc by controlling the first optical disc drive ODD1 of the first drive bay 107. The SBC of the second drive bay 109 records data on the first surface of the second optical disc by controlling the second optical disc drive ODD2 of the second drive bay 109.

Figure 10:
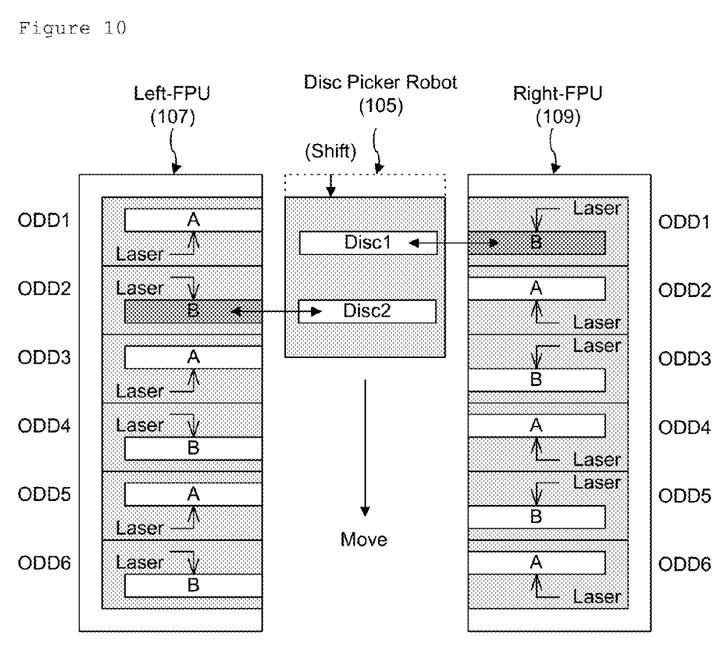

If the data recording operation on the first surface A is finished as described above, the disc picker robot 105 extracts the two double sided discs Disc1 and Disc2 and then inserts the first and second optical discs Disc1 and Disc2 respectively into the first optical disc drive ODD1 mounted in the second drive bay 109 and the second optical disc drive ODD2 mounted in the first drive bay 107 by moving between the first and second drive bays 107 and 109 by the interval between the insertion slot of the first optical disc drive ODD1 of the first drive bay 107 and the insertion slot of the first optical disc drive ODD1 of the second drive bay 109.

The SBC of the first drive bay 107 records data on the second surface of the second optical disc by controlling the second optical disc drive ODD2 of the first drive bay 107, and records data on the second surface of the first optical disc by controlling the first optical disc drive ODD1 of the second drive bay 109.

Figure 11:
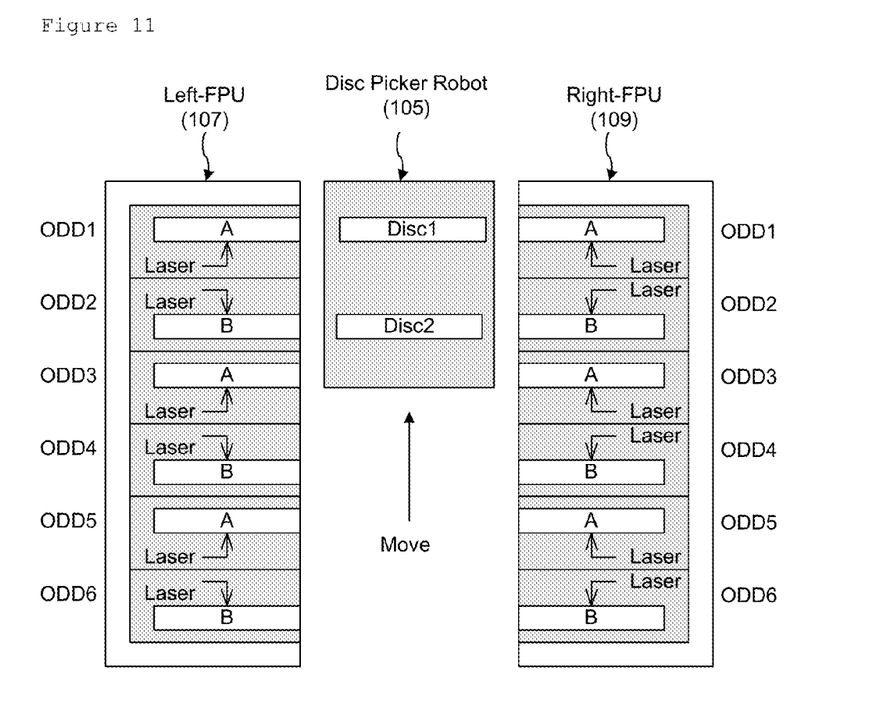
FIG. 11 schematically illustrates an archive system for a double sided optical disc according to a fourth exemplary embodiment of the present invention.

Meanwhile, in an archive system according to a fourth exemplary embodiment of the present invention, an ODD capable of recording data on the first surface A of the double sided optical disc and an ODD capable of recording data on the second surface B of the double sided optical disc form a pair, so as to be repetitively mounted in the left first drive bay and the right second drive bay. For example, as shown in FIG. 11, ODDs respectively mounted in the first and second drive bays may be mounted to face each other.

Figure 12:
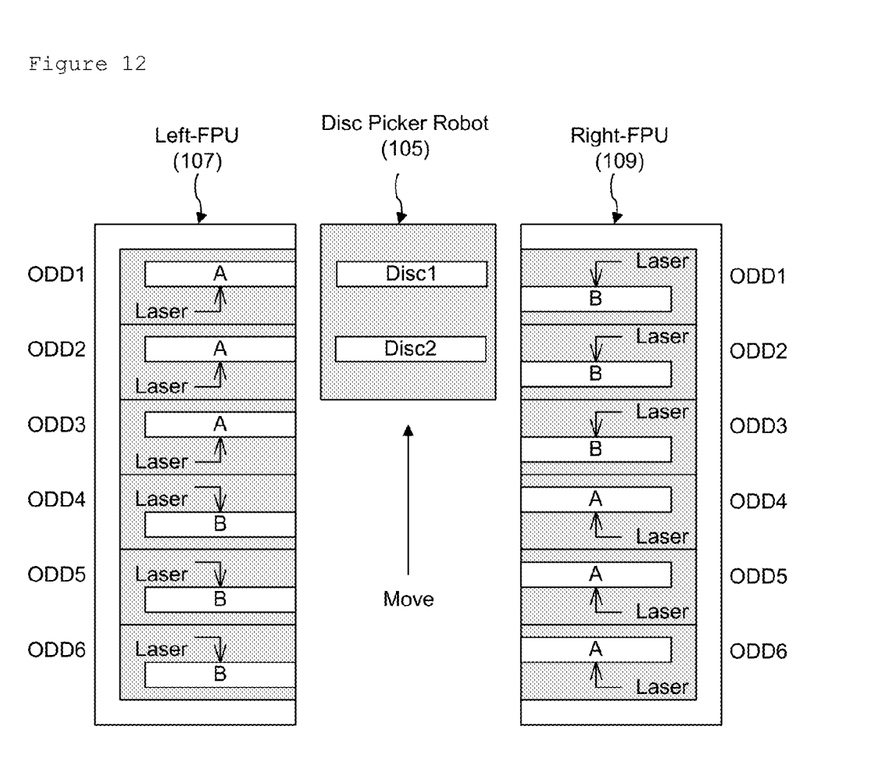
FIG. 12 schematically illustrates an archive system for a double sided optical disc according to a fifth exemplary embodiment of the present invention.

In an archive system according to a fifth exemplary embodiment of the present invention, as shown in FIG. 12, three ODDs for recording data the first surfaces of the double sided optical discs and three ODDs for recording data the second surfaces of the double sided optical discs may be sequentially mounted in the first drive bay.

Three ODDs for recording data the second surfaces of the double sided optical discs and three ODDs for recording data the first surfaces of the double sided optical discs may also be sequentially mounted in the second drive bay.

In this case, data recording operations on the double sided optical discs may be performed using only the ODDs of the first drive bay 107 or using only the ODDs of the second drive bay 109.

While we have shown and described several embodiments in accordance with the present invention, it is understood that the same is not limited thereto but is susceptible of numerous changes and modifications as known to those skilled in the art, and we therefore do not wish to be limited to the details shown and described herein but intended to cover all such changes and modifications as are encompassed by the scope of the appended claims.

What is claimed is:

1. An archive system for a double sided optical disc, comprising:

a disc cartridge for keeping optical discs;

a drive bay for mounting optical disc drives therein; and a disc picker robot for extracting the optical discs kept in the disc cartridge and inserting the extracted optical discs into the optical disc drives mounted in the drive bay, wherein first and second drive bays are respectively mounted at left and right sides of the disc picker robot, wherein an optical disc drive for recording or reading data on a first surface of a double sided optical disc and an optical disc drive for recording or reading data on a second surface of the double sided optical disc, which form a pair, are repetitively mounted in the first and second drive bays, wherein an insertion slot of each of the optical disc drives is not located at a center of the optical disc drive along a direction in which the disc picker robot moves, wherein one of an optical disc drive of the first drive bay and an optical disc drive of the second drive bay, which face the optical disc drive of the first drive bay, records or reads data on the first surface, and the other records or reads data on the second surface, and wherein, when two or more optical discs are simultaneously inserted in the disc picker robot, an interval between two optical discs inserted in the disc picker robot is identical to that between two optical disc drives, the two optical disc drives recording or reading data on surfaces in a same direction and being closest along a direction in which the disc picker robot moves, one of the two optical disc drives belonging to the first drive bay while the other of the two optical disc drives belongs to the second drive bay.

2. The archive system of claim 1, wherein, when carrying two optical discs, the disc picker robot records or reads data on first or second surfaces of the optical discs by respectively inserting the optical discs into a first optical disc drive of the first drive bay and a second disc drive of the second drive bay.

3. The archive system of claim 2, wherein, when a data recording or reading operations on the first or second surfaces are finished, the disc picker robot extracts the two optical discs, moves by the interval between an insertion slot of the first optical disc drive of the first drive bay and an insertion slot of the first optical disc drive of the second drive bay, respectively inserts the optical discs into the first optical disc drive of the second drive bay and the second optical disc drive of the first drive bay, and then records or reads data on the second or first surfaces of the optical discs.

* * * * *